United States Patent [19]

Goto

[11] Patent Number: 5,449,495

[45] Date of Patent: Sep. 12, 1995

[54] NITROGEN OXIDE REMOVAL CONTROL APPARATUS

[75] Inventor: Yasuo Goto, Saitama, Japan

[73] Assignee: Kabushiki Kaisha Toshiba, Kanagawa, Japan

[21] Appl. No.: 171,454

[22] Filed: Dec. 22, 1993

[30] Foreign Application Priority Data

Dec. 25, 1992 [JP] Japan .................................. 4-346911

[51] Int. Cl.⁶ ...................... B01D 53/56; B01D 53/90; G05D 11/08; G05D 11/13
[52] U.S. Cl. ..................................... 422/111; 364/500; 395/900; 395/906; 395/907; 423/239.1; 422/168; 422/177
[58] Field of Search ................ 422/111, 168, 172, 177, 422/187; 423/239.1; 364/500; 395/900, 906, 907

[56] References Cited

U.S. PATENT DOCUMENTS

| | | | |
|---|---|---|---|
| 4,188,190 | 2/1980 | Muraki et al. | 436/55 |
| 4,314,345 | 2/1982 | Shiraishi et al. | 422/111 X |
| 4,473,536 | 9/1984 | Carberg et al. | 423/239.1 |
| 4,473,537 | 9/1984 | Ford, Jr. et al. | 423/239.1 |
| 4,565,679 | 1/1986 | Michalak et al. | 423/239.1 |
| 4,681,746 | 7/1987 | Michalak et al. | 423/239.1 |
| 4,751,054 | 6/1988 | Watanabe | 422/111 |
| 5,158,024 | 10/1992 | Tanaka et al. | 395/900 X |

FOREIGN PATENT DOCUMENTS

| | | |
|---|---|---|
| 263183 | 4/1988 | European Pat. Off. . |
| 263195 | 4/1988 | European Pat. Off. . |
| 2414949 | 8/1979 | France . |
| 3337793 | 5/1985 | Germany . |

OTHER PUBLICATIONS

Kraushaar et al., ABB Review, No. 9, "Fuzzy-based Controller Improves Denox Performance in Power Plants", 13–20 (Sep. 1993).

Primary Examiner—Robert J. Warden
Assistant Examiner—Robert Carpenter
Attorney, Agent, or Firm—Finnegan, Henderson, Farabow, Garrett & Dunner

[57] ABSTRACT

A plant with a gas turbine such as a combined cycle power plant of a gas turbine cycle and a steam turbine cycle is provided with a nitrogen oxide removal device for removing $NO_x$ by injecting ammonia to an exhaust gas of the gas turbine. The device reduces $NO_x$ concentration to a certain value or less before the exhaust gas is released to the air. An ammonia flow amount is rapidly controlled such that a mole ratio of ammonia to $NO_x$ coincides with a set mole ratio value. The mole ratio is calculated from a predicted $NO_x$ concentration at an inlet of the nitrogen oxide removal device predicted by calculating operation conditions of the gas turbine, an ammonia flow amount value, and an exhaust gas flow amount. The set mole ratio value is calculated from a deviation of a measured $NO_x$ concentration value at an outlet of the nitrogen oxide removal device and a set $NO_x$ concentration value, and an amount of water injected to a combustor. Finally, a controlled system is stabilized in a state where a measured $NO_x$ concentration value coincides with the set $NO_x$ concentration value at a high speed.

12 Claims, 8 Drawing Sheets

FIG. 3

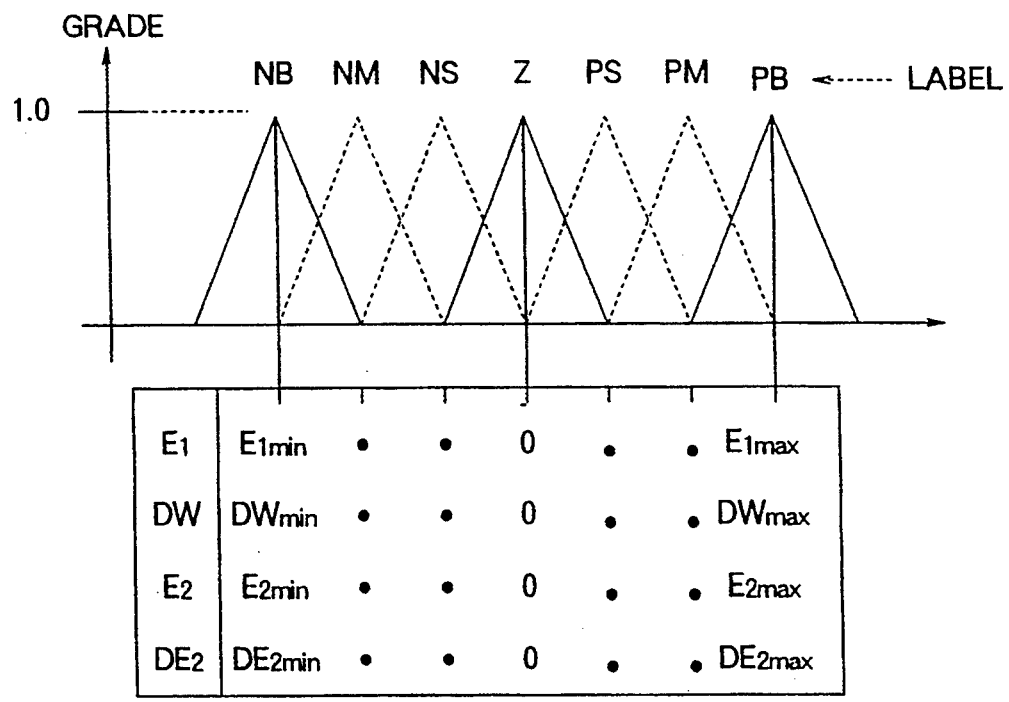

FIG. 4

| RULE A1  | IF 'E1'='NB' AND 'DW'='Z'  THEN 'DM'='PB' |
| RULE A2  | IF 'E1'='NM' AND 'DW'='Z'  THEN 'DM'='PM' |
| RULE A3  | IF 'E1'='NS' AND 'DW'='Z'  THEN 'DM'='PS' |
| RULE A4  | IF               'DW'='NB' THEN 'DM'='PB' |
| RULE A5  | IF               'DW'='NM' THEN 'DM'='PM' |
| RULE A6  | IF               'DW'='NS' THEN 'DM'='PS' |
| RULE A7  | IF 'E1'='Z'  AND 'DW'='Z'  THEN 'DM'='Z'  |
| RULE A8  | IF               'DW'='PS' THEN 'DM'='NS' |
| RULE A9  | IF               'DW'='PM' THEN 'DM'='NM' |
| RULE A10 | IF               'DW'='PB' THEN 'DM'='NB' |
| RULE A11 | IF 'E1'='PS' AND 'DW'='Z'  THEN 'DM'='NS' |
| RULE A12 | IF 'E1'='PM' AND 'DW'='Z'  THEN 'DM'='NM' |
| RULE A13 | IF 'E1'='PB' AND 'DW'='Z'  THEN 'DM'='NB' |

FIG. 5

```
RULE B1   IF 'E2'='NB' AND 'DE2'='Z'  THEN 'DU'='NB'
RULE B2   IF 'E2'='NM' AND 'DE2'='Z'  THEN 'DU'='NM'
RULE B3   IF 'E2'='NS' AND 'DE2'='Z'  THEN 'DU'='NS'
RULE B4   IF 'E2'='Z'  AND 'DE2'='NB' THEN 'DU'='NB'
RULE B5   IF 'E2'='Z'  AND 'DE2'='NM' THEN 'DU'='NM'
RULE B6   IF 'E2'='Z'  AND 'DE2'='NS' THEN 'DU'='NS'
RULE B7   IF 'E2'='Z'  AND 'DE2'='Z'  THEN 'DU'='Z'
RULE B8   IF 'E2'='Z'  AND 'DE2'='PS' THEN 'DU'='PS'
RULE B9   IF 'E2'='Z'  AND 'DE2'='PM' THEN 'DU'='PM'
RULE B10  IF 'E2'='Z'  AND 'DE2'='PB' THEN 'DU'='PB'
RULE B11  IF 'E2'='PS' AND 'DE2'='Z'  THEN 'DU'='PS'
RULE B12  IF 'E2'='PM' AND 'DE2'='Z'  THEN 'DU'='PM'
RULE B13  IF 'E2'='PB' AND 'DE2'='Z'  THEN 'DU'='PB'
RULE B14  IF 'E2'='NB' AND 'DE2'='PS' THEN 'DU'='NM'
RULE B15  IF 'E2'='NS' AND 'DE2'='PS' THEN 'DU'='Z'
RULE B16  IF 'E2'='NS' AND 'DE2'='PB' THEN 'DU'='PM'
RULE B17  IF 'E2'='PS' AND 'DE2'='NB' THEN 'DU'='NM'
RULE B18  IF 'E2'='PS' AND 'DE2'='NS' THEN 'DU'='Z'
RULE B19  IF 'E2'='PB' AND 'DE2'='NS' THEN 'DU'='PM'
RULE B20  IF 'E2'='NB' AND 'DE2'='PB' THEN 'DU'='Z'
RULE B21  IF 'E2'='NB' AND 'DE2'='PM' THEN 'DU'='NS'
RULE B22  IF 'E2'='NB' AND 'DE2'='NS' THEN 'DU'='NB'
RULE B23  IF 'E2'='NB' AND 'DE2'='NM' THEN 'DU'='NB'
RULE B24  IF 'E2'='NB' AND 'DE2'='NB' THEN 'DU'='NB'
RULE B25  IF 'E2'='NM' AND 'DE2'='PB' THEN 'DU'='PS'
RULE B26  IF 'E2'='NM' AND 'DE2'='PM' THEN 'DU'='Z'
RULE B27  IF 'E2'='NM' AND 'DE2'='PS' THEN 'DU'='NS'
RULE B28  IF 'E2'='NM' AND 'DE2'='NS' THEN 'DU'='NB'
RULE B29  IF 'E2'='NM' AND 'DE2'='NM' THEN 'DU'='NB'
RULE B30  IF 'E2'='NM' AND 'DE2'='NB' THEN 'DU'='NB'
RULE B31  IF 'E2'='NS' AND 'DE2'='PM' THEN 'DU'='PS'
RULE B32  IF 'E2'='NS' AND 'DE2'='NS' THEN 'DU'='NM'
RULE B33  IF 'E2'='NS' AND 'DE2'='NM' THEN 'DU'='NB'
RULE B34  IF 'E2'='NS' AND 'DE2'='NB' THEN 'DU'='NB'
RULE B35  IF 'E2'='PS' AND 'DE2'='PB' THEN 'DU'='PB'
RULE B36  IF 'E2'='PS' AND 'DE2'='PM' THEN 'DU'='PB'
RULE B37  IF 'E2'='PS' AND 'DE2'='PS' THEN 'DU'='PM'
RULE B38  IF 'E2'='PS' AND 'DE2'='NM' THEN 'DU'='NS'
RULE B39  IF 'E2'='PM' AND 'DE2'='PB' THEN 'DU'='PB'
RULE B40  IF 'E2'='PM' AND 'DE2'='PM' THEN 'DU'='PB'
RULE B41  IF 'E2'='PM' AND 'DE2'='PS' THEN 'DU'='PB'
RULE B42  IF 'E2'='PM' AND 'DE2'='NS' THEN 'DU'='PS'
RULE B43  IF 'E2'='PM' AND 'DE2'='NM' THEN 'DU'='Z'
RULE B44  IF 'E2'='PM' AND 'DE2'='NB' THEN 'DU'='NS'
RULE B45  IF 'E2'='PB' AND 'DE2'='PB' THEN 'DU'='PB'
RULE B46  IF 'E2'='PB' AND 'DE2'='PM' THEN 'DU'='PB'
RULE B47  IF 'E2'='PB' AND 'DE2'='PS' THEN 'DU'='PB'
RULE B48  IF 'E2'='PB' AND 'DE2'='NM' THEN 'DU'='PS'
RULE B49  IF 'E2'='PB' AND 'DE2'='NB' THEN 'DU'='Z'
```

NITROGEN OXIDE REMOVAL CONTROL APPARATUS

BACKGROUND OF THE INVENTION

1. Field of the Invention

The present invention relates to a nitrogen oxide removal control apparatus and a method for reducing nitrogen oxide concentration in an exhaust gas by controlling an amount of ammonia which is injected to the exhaust gas of a gas turbine in a power generation plant.

2. Description of the Related Art

Recently, increasing demands for energy have caused a strong dependency on fossil fuel. As the energy supply amount owing to fossil fuel increases, $CO_2$ exhaust amount has increased. Thus, the crisis of global warming has arisen and there is a worldwide move to put restrictions on the $CO_2$ exhaust amount.

From the above view point, a combined power generation plant is expected to increase energy efficiency and allow reduction of $CO_2$. This system is constructed by combination of a gas turbine and a steam turbine where steam is generated by using heat of exhaust gas of the gas turbine to drive the steam turbine.

As shown in FIG. 1, such a combined cycle power plant is provided with a gas turbine cycle 1, an heat recovery steam generator 3 for generating steam by using exhaust gas 2 of the gas turbine cycle 1 as a heat source, a steam turbine cycle 4 which uses this generated steam as a driving steam, and a chimney 5 for exhausting the heat-recovered exhausting gas. In the gas turbine cycle 1, fuel 8 supplied from a fuel system is combusted with air 6 compressed by an air compressor 7 in a combustor 9. Combustion gas generated drives a turbine 10. A generator 11 is connected to the turbine 10. After the exhaust gas 2 works, exhaust heat of the exhaust gas 2 is released to produce steam in the exhaust heat recovery steam generator 3 while the exhaust gas passes through an exhaust gas duct 12 to the chimney 5. The exhaust heat recovery steam generator 3 has a superheater 13, an evaporator 14, a nitrogen oxide removal device 15 and an economizer 16 along the upstream side to the downstream side of the exhaust gas duct 12. Steam generated in the superheater 13 is supplied to the steam turbine cycle 4 via a steam tube 17. In the steam turbine cycle 4, the steam coming out of a turbine 18 is condensed by a condenser 20. The condensate is introduced to the economizer 16 by a feed water tube 21, heated therein, evaporated in the evaporator 14, and the steam is further heated in the superheater 13. In the evaporator 14, while feed water is forcedly circulated or naturally circulated by temperature difference, heat-absorption and evaporation are effected. In FIG. 1, although the turbine 18 is connected to a generator 19, both the turbines 10 and 18 may be connected to the same generator to construct single shaft type combined cycle power plant.

In a plant with a gas turbine cycle 1 such as above combined cycle power plant, firing temperature is preferably higher to increase the plant efficiency and relatively reduce $CO_2$. However, as firing temperature increases, nitrogen oxide ($NO_x$) emitted from a gas turbine cycle 1 increases exponentially with the increasing temperature. Since this nitrogen oxide ($NO_x$) is recognized as one contributing factor in air pollution, strict standards are applied to its emission.

Illustrative methods for reducing $NO_x$ concentration are a method where water or steam is injected to a combustor 9 to decrease firing temperature, a method where fuel and air is mixed in advance and then the mixture is introduced to the combustor 9 to prevent a partial higher part, and a method where a multistaged combustor capable of averaging combustion temperature is used.

However, it is difficult with only these methods to achieve the $NO_x$ emission standards. Thus, the nitrogen oxide removal device 15 is provided in a flow path of exhaust gas to reduce $NO_x$ emission. There is an ammonia injection/dry selective catalytic reduction decomposition method as one nitrogen oxide removal method applied to in this nitrogen oxide removal device. In the method, ammonia is injected to exhaust gas and the exhaust gas is passed through catalyst 22 placed on the downstream side of the injection point so that nitrogen oxide is reduced and decomposed to non-toxic nitrogen component and water steam. Generally, this method has good reaction efficiency at 300° C. to 400° C. based on the temperature properties of the catalyst. Accordingly, the nitrogen oxide removal device 15 using this method is placed between the evaporator 14 and the economizer 16.

In this nitrogen oxide removal device 15, $NO_x$ removal is controlled by adjusting an ammonia injection amount from an ammonia injection system 23. U.S. Pat. No. 4,473,536 and U.S. Pat. No. 4,473,537 disclose control system where a mole ratio of ammonia to $NO_x$ is obtained by proportional integral (PI) control based on a deviation of a set $NO_x$ value and a measured $NO_x$ value, and this is multiplied by a calculated predicted $NO_x$ value at an inlet of the nitrogen oxide removal device to obtain an ammonia injection amount. However, in this control system, since a predicted $NO_x$ value is multiplied, loop gain varies dependently on the predicted $NO_x$ value. If the predicted $NO_x$ value becomes smaller, there is a tendency that loop gain is also decreased to degrade response.

Further, the other following control system has already been known. In this system, when load of a gas turbine and the like do not change, an ammonia flow amount is controlled by feedback control loop which does proportional integral operation based on a deviation of a set $NO_x$ value and a measured $NO_x$ value. When disturbance such as a load change of a gas turbine, which effects $NO_x$ generation, is detected, an ammonia amount based on the detected disturbance amount is obtained by feedforward control loop. This ammonia amount, which use as a feedforward control signal, is added to a feedback control signal obtained by proportional integral operation of a deviation of a set $NO_x$ value and a measured $NO_x$ value, thereby controlling an ammonia flow amount. A delay time is about four minutes from a time when an ammonia flow amount adjustment valve is opened or closed to a time when this opening or closing influences a measured $NO_x$ value. On the contrary, it takes about a second or less that exhaust gas of a gas turbine passes from the gas turbine to a chimney. Thus, when there is disturbance such as a load change of the gas turbine, an ammonia flow amount cannot be controlled by the above-mentioned feedback control loop. For this reason, according to this control system, when disturbance such as a load change of the gas turbine is detected, a relay is activated, a contact of an output part of the above-mentioned feedforward control loop is closed, and a contact between a proportional operating unit and an integral operating unit of the feedback control loop is opened. As a result, input to an integral controller is stopped to prevent unnecessary history from remaining in the integral operating unit. However, a single shaft type combined cycle of a gas turbine and steam turbine has problems that it is difficult to exactly detect load change of a gas turbine and a load change detecting relay, which switches opening/closing of each control loop contact, does not always exactly operate.

SUMMARY OF THE INVENTION

An object of the invention is to provide a nitrogen oxide removal control apparatus and method for removing nitrogen oxide by injecting ammonia into an exhaust gas flow from a gas turbine, which overcomes the above drawbacks of the related art.

Another object of the invention is to provide a nitrogen oxide removal control apparatus and method capable of properly controlling a nitrogen oxide concentration in an exhaust gas from a gas turbine even in single shaft type combined cycle power plants of a gas turbine cycle and a steam turbine cycle where it is difficult to correctly judge load change of the gas turbine, separately.

Still another object of the invention is to provide a nitrogen oxide removal control apparatus and method for an exhaust gas from a gas turbine with the excellent control performance independently of change in the gas turbine conditions, the apparatus and method using a measured $NO_x$ concentration signal, a representing state signal of a $NO_x$ reducing means in a combustor of the gas turbine, an ammonia flow amount signal, and a predicted $NO_x$ concentration signal calculated from a state value of a gas turbine as control factors.

Further still another object of the invention is to provide a nitrogen oxide removal control apparatus and method for an exhaust gas from a gas turbine where feedback control based on the measured $NO_x$ concentration signal and feedforward control based on a representing state signal of a $NO_x$ reducing means are fused by using the fuzzy theory.

The first aspect of the present invention provides a nitrogen oxide removal control apparatus comprising a predicted mole ratio operating system, a mole ratio setting system, and a mole ratio control system. The predicted mole ratio operating system provides a predicted mole ratio of ammonia to $NO_x$ in an exhaust gas on the basis of a predicted $NO_x$ concentration value at an inlet of the nitrogen oxide removal device which value is calculated from state values of a gas turbine, a value of the exhaust gas flow amount, and a value of the ammonia flow amount injected into this exhaust gas. The mole ratio setting system provides a set mole ratio value of ammonia to $NO_x$ on the basis of a deviation of a measured $NO_x$ concentration value at an outlet of the nitrogen oxide removal device and a set $NO_x$ concentration value, and a representing state value of a $NO_x$ reducing means in a combustor of a gas turbine. The mole ratio control system manipulates an ammonia flow control value on the basis of a deviation of an output from the mole ratio setting system and an output from the predicted mole ratio operating system.

According to this invention, an ammonia injection amount is controlled at a high speed such that a predicted mole ratio comes up to a set mole ratio value, which control is performed by using a predicted $NO_x$ concentration at an inlet of a nitrogen oxide removal device whose response speed is high but the accuracy is slightly inferior. Further, the set mole ratio value is amended with a measured $NO_x$ concentration value at an outlet of a nitrogen oxide removal device whose response speed is slightly slow but the accuracy is superior. Thus, immediate response for disturbance such as a load change of a gas turbine is possible, and finally a state where a measured $NO_x$ concentration value at an outlet of a nitrogen oxide removal device coincides with a set $NO_x$ concentration value is established at a high speed and maintained. Moreover, a mole ratio setting system can properly correspond to change with age of a controlled system. Further, the mole ratio control system accurately responds to flow amount changes due to deterioration with age of an ammonia flow control valve because of the feedback of an ammonia flow amount, so amending control of the mole ratio control system may be a minimum. Thus, excellent control properties can always be maintained.

The second aspect of the present invention provides a nitrogen oxide removal control apparatus comprising a predicted mole ratio operating system, a mole ratio setting system, and a mole ratio control system. The predicted mole ratio operating system provides a predicted mole ratio of ammonia to $NO_x$ in an exhaust gas on the basis of a predicted $NO_x$ concentration value at an inlet of a nitrogen oxide removal device which value is calculated from state values of the gas turbine, an exhaust gas flow amount value, and a flow amount of ammonia injected into this exhaust gas flow. The mole ratio setting system provides a set mole ratio value of ammonia to $NO_x$ by the fuzzy inference on the basis of a deviation of a measured $NO_x$ concentration value at an outlet of the nitrogen oxide device and a set $NO_x$ concentration value, and a representing state value change of a $NO_x$ reducing means in a combustor of a gas turbine. The mole ratio control system manipulate an ammonia flow control value on the basis of a deviation of an output from the mole ratio setting system and an output from the predicted mole ratio operating system.

According to this invention, in the mole ratio setting system, feedback control based on a deviation of a measured $NO_x$ concentration value at an outlet of a nitrogen oxide removal device and a set $NO_x$ concentration value, and feedforward control based on change in a state amount of a $NO_x$ reducing means are conducted by the fuzzy inference. As a result, according to change in a representing state value of a $NO_x$ reducing means, transition between the feedback control and the feedforward control can automatically and bumplessly be carried out. Namely, a flexible state where feedback control system can always serve as a backup for feedforward control system can be maintained. This mole ratio setting system is combined with the predicted mole ratio operating system based on a predicted $NO_x$ concentration value which may contain errors but responds at a high speed by cascade system. As a result, speedy, correct and stable nitrogen oxide control can be performed against errors caused by a predicted $NO_x$ concentration value, change in the properties with age and the like.

The third aspect of the invention provides a nitrogen oxide removal control method, comprising the steps of operating a deviation of a measured $NO_x$ concentration value at an outlet of a nitrogen oxide removal device, and a set $NO_x$ concentration value; operating a set mole ratio value of ammonia to $NO_x$ based on this deviation and a representing state value of a $NO_x$ reducing means in a combustor of a gas turbine; predicting a mole ratio of ammonia to $NO_x$ in an exhaust gas based on an ammonia flow amount value, an exhaust gas flow amount value and a predicted $NO_x$ concentration value at an inlet of a nitrogen oxide removal device; and controlling an ammonia flow amount to be injected into the exhaust gas based on a deviation of the predicted mole ratio and the set mole ratio value.

The fourth aspect of the invention provides a nitrogen oxide removal control method, comprising the steps of operating a deviation of a measured $NO_x$ concentration value at an outlet of a nitrogen oxide removal device, and a set $NO_x$ concentration value; operating a change rate of a representing state value of a $NO_x$ reducing means in a combustor of a gas turbine; calculating a set mole ratio value of ammonia to $NO_x$ by the fuzzy inference based on the $NO_x$ concentration deviation and the change rate of a state value; predicting a mole ratio of ammonia to $NO_x$ in an exhaust gas based on an ammonia flow amount value, an exhaust gas flow amount value and a predicted $NO_x$ concentration value at an inlet of a nitrogen oxide removal device; and controlling an ammonia flow amount to be injected into the exhaust gas based on a deviation of the predicted mole ratio and the set mole ratio value.

According to the nitrogen oxide removal control method of the invention, even when nitrogen oxide properties change due to load change of a gas turbine, it is unnecessary to correctly detect the load change of a gas turbine. Flexible and safe nitrogen oxide removal control with high speed and stable controlling properties can be realized.

The other objects, features and advantages will be apparent from the following detail description referring to drawings, in which like reference numerals designate the same elements.

BRIEF DESCRIPTION OF THE DRAWINGS

FIG. 3 is a view showing an example of membership functions in fuzzy control.

FIG. 4 is a list showing an embodiment of mole ratio setting rule of FIG. 2.

FIG. 5 is a list showing an embodiment of mole ratio control rule of in FIG. 2.

DESCRIPTION OF THE PREFERRED EMBODIMENTS

Figure 1:
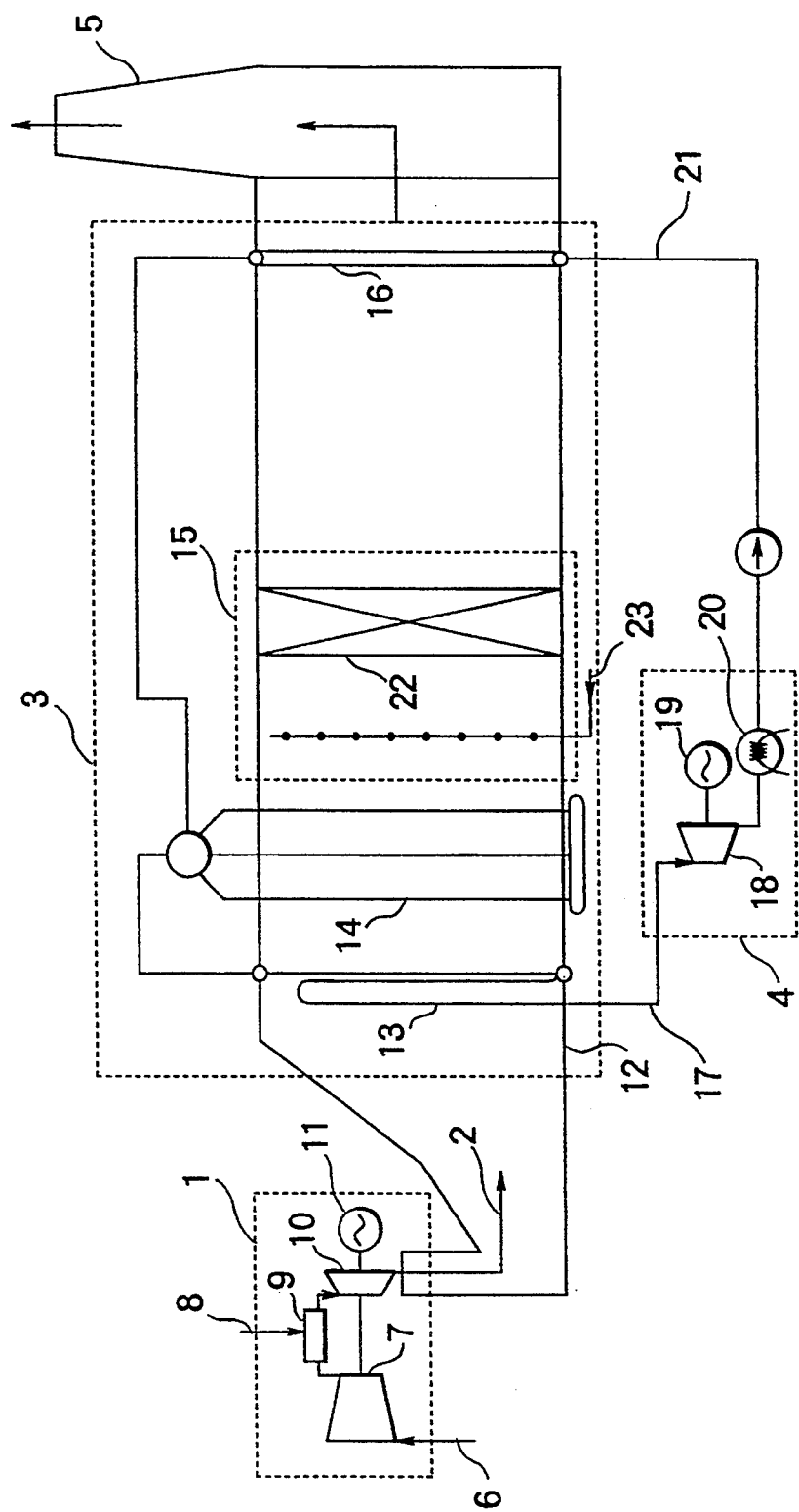
FIG. 1 is a schematic view showing a structure of a combined power generation plant in which the invention is used.
Figure 2:
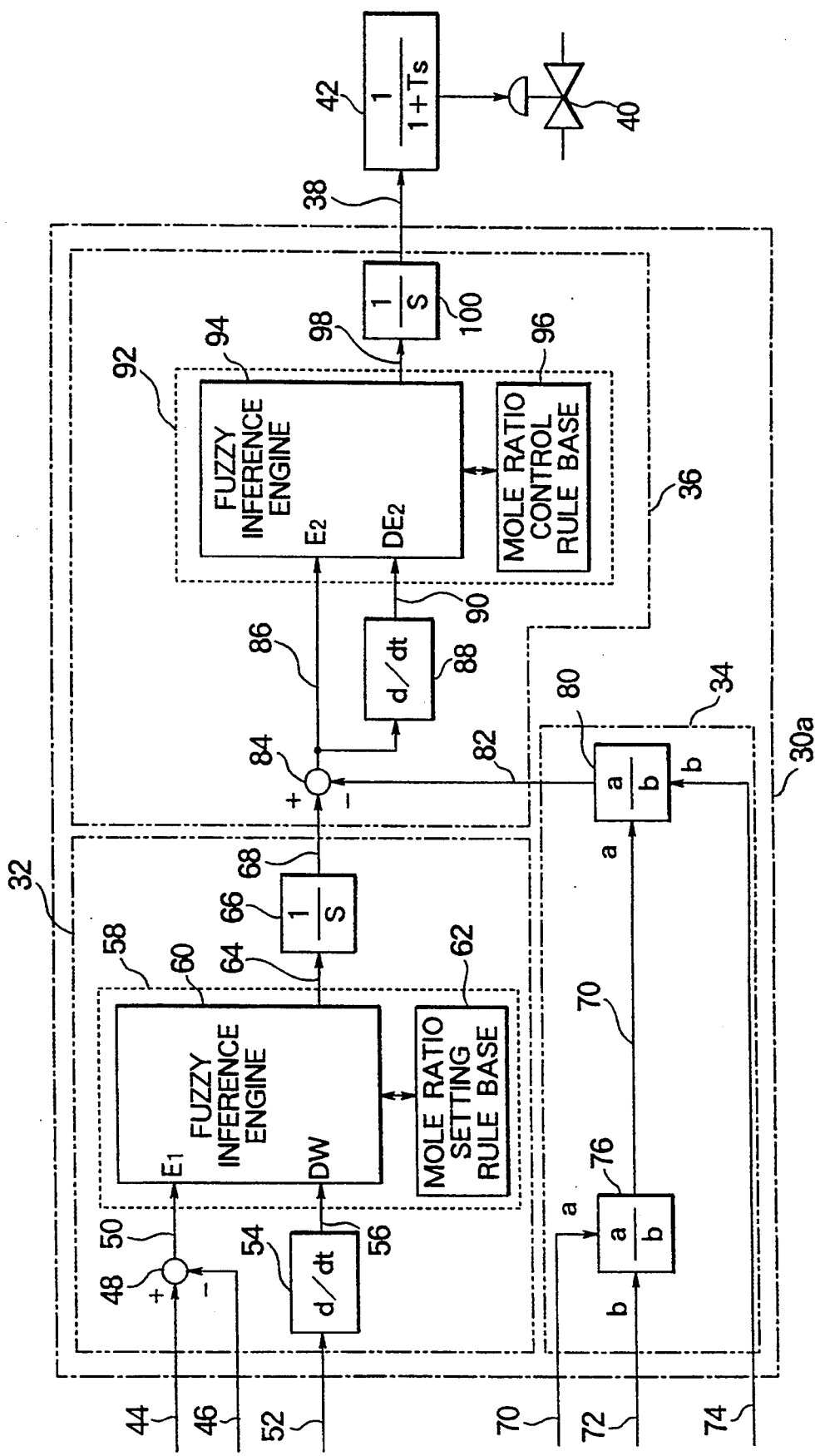
FIG. 2 is a block diagram showing one embodiment of a nitrogen oxide removal apparatus according to the invention.

Referring now to FIG. 2, a nitrogen oxide removal control device 30a is composed of a mole ratio setting system 32, a predicted mole ratio operating system 34, and a mole ratio control system 36. The device 30a provides a valve opening degree control signal 38 to an actuator 42 of an ammonia flow amount adjusting vale 40.

To the mole ratio setting system 32 are supplied a set $NO_x$ concentration signal 44 related to a plant exhaust gas $NO_x$ set point which is determined in accordance with standard and the like, and a measured $NO_x$ concentration signal 46 related to a $NO_x$ concentration in an exhaust gas of a nitrogen oxide removal device outlet. An adder 48 produces a signal 50 of a $NO_x$ deviation thereof. A water injection amount signal 52 related to an amount of water injected to the combustor 9 for lowering firing temperature is also supplied to the mole ratio setting system 32, and the signal 52 is time differentiated by a differentiator 54 to produce a water injection amount change rate signal 56. A signal from the other proper means for reducing $NO_x$ ($NO_x$ reducing means) may be used instead of a water injection amount signal 52. Examples of such a signal include an amount of water steam injected instead of water, and ratio of a fuel flow amount of a main nozzle to total fuel flow amount when a two-staged combustor equipped with a pilot nozzle and the main nozzle is used.

The $NO_x$ deviation signal 50 and the water injection amount change rate signal 56 are supplied to a fuzzy controller 58. The fuzzy controller 58 has a fuzzy inference engine 60 and a mole ratio setting rule data base 62. The fuzzy inference engine 60 lets the input signals 50 and 56 to be subjected to clustering in accordance with membership functions as shown in FIG. 3 in dependence on a value E1 of the signal 50 and a value DW of the signal 56, respectively. They are used as an input to a conditional statements of the mole ratio setting rule data base 62 and fire a corresponding rule of the mole ratio setting rule data base 62 to perform fuzzy inference. This fuzzy inference provides a value DM of a change rate of a set mole ratio of ammonia to $NO_x$. In the mole ratio setting rule data base 62 which is applied to the fuzzy controller 58, as shown in FIG. 4, if the value DW of the signal 56 is large, e.g., during load change, feedforward control based on the signal 56 is performed; and if the value DW of the signal 56 is small, both feedback control based on the $NO_x$ deviation signal 50 and feedforward control based on the water injection amount change rate signal 56 are used. The two control systems automatically and bumplessly change to each other.

A mole ratio change rate signal 64 supplied from the fuzzy controller 58 is integrated by an integrator 66 to be changed to a mole ratio setting signal 68.

To the predicted mole ratio operating system 34 are supplied an ammonia flow amount signal 70 obtained by measurement, an exhaust gas flow amount signal 72 obtained by measurement or operation, and a predicted $NO_x$ concentration signal 74 in an exhaust gas of a nitrogen oxide removal device inlet calculated as high speeds from each kind of state value of a gas turbine 1. For example, this signal 74 can be calculated by the method disclosed by U.S. Pat. No. 4,473,536 and U.S. Pat. No. 4,473,537.

In a divider 76, the ammonia flow amount signal 70 is divided by the exhaust gas flow amount signal 72 to be changed to an ammonia concentration signal 70. This ammonia concentration signal 70 is divided by the predicted $NO_x$ concentration signal 74 in a divider 80 to produce a mole ratio (signal 82) of an injected ammonia amount to a predicted $NO_x$ amount of a nitrogen oxide removal device inlet. This ratio is an output of the predicted mole ratio operating system 34.

In the mole ratio control system 36, an adder 84 provides a deviation of the set mole ratio signal 68 from the mole ratio setting system 32 and the predicted mole ratio signal 82 from the predicted mole ratio operating system 34. This mole ratio deviation signal 86 is supplied to a fuzzy controller 92 together with a mole ratio deviation change rate signal 90 which is obtained by time differentiating the mole ratio deviation signal 86 by a differentiator 88. The fuzzy controller 92 has a fuzzy inference engine 94 and a mole ratio control rule 96. The fuzzy inference engine 94 lets the signals 86 and 90 to be subjected to clustering in accordance with membership functions as shown in FIG. 3 in dependence on a value E2 of the signal 86 and a value DE2 of the signal 90, respectively. They are used as an input to conditional statements of the mole ratio control rule 96 as shown in FIG. 5 and fire a corresponding rule of the mole ratio control rule data base 96 to perform fuzzy inference. This fuzzy inference generates a value DU of a valve opening degree manipulating signal 98 of the ammonia flow control valve 40.

This valve opening degree manipulating signal 98 is integrated by an integrator 100 to become the valve opening degree control signal 38 which is provided to the actuator 42 of the ammonia flow control valve 40.

In this embodiment, an ammonia injection amount is controlled at a high speed by using a predicted $NO_x$ concentration of a nitrogen oxide removal device inlet whose response speed is high such that a predicted mole ratio comes up to a set mole ratio value. The set mole ratio value is amended by a measured $NO_x$ concentration value of a nitrogen oxide removal device outlet whose accuracy is high. Finally, nitrogen oxide removal control is stabilized at a high speed in a state where the measured $NO_x$ concentration value of a nitrogen oxide removal device outlet coincides with a set $NO_x$ concentration value.

As described above, according to the embodiments, the mole ratio setting system 32 is combined with the predicted mole ratio operating system 34 by cascade system. Here, the system 34 is based on a predicted $NO_x$ concentration signal 74 which may contain errors but responds at a high speed, and the system 32 is based on a measured $NO_x$ concentration signal 46 which has long delay time but correct. As a result, nitrogen oxide removal can correctly be controlled at high speed with the advantages of both the system 32 and 34. In addition, nitrogen oxide removal control can safely and stably be performed against errors caused by a predicted $NO_x$ concentration signal 74 of the predicted mole ratio operating 34, and change in the properties of a system to be controlled with age, because the mole ratio setting system 32 can act as backup. Further, this is most suitable for a single shaft type combined cycle power plant of a gas turbine cycle and a steam turbine cycle because it is unnecessary to properly judge load change of the gas turbine. Moreover, in the mole ratio setting system 32, feedback control based on the $NO_x$ deviation signal 50 and feedforward control based on a water injection amount change rate signal 56 are fused by using the fuzzy theory. Thus, there is no concept of conventional complete switching between feedback control and feedforward control and a flexible state where feedback control can always act as backup, allowing flexible and safe nitrogen oxide removal control. Further, since control gain is not changed by supplied control factors, stable nitrogen oxide removal control with the excellent performance is always possible.

Figure 6:
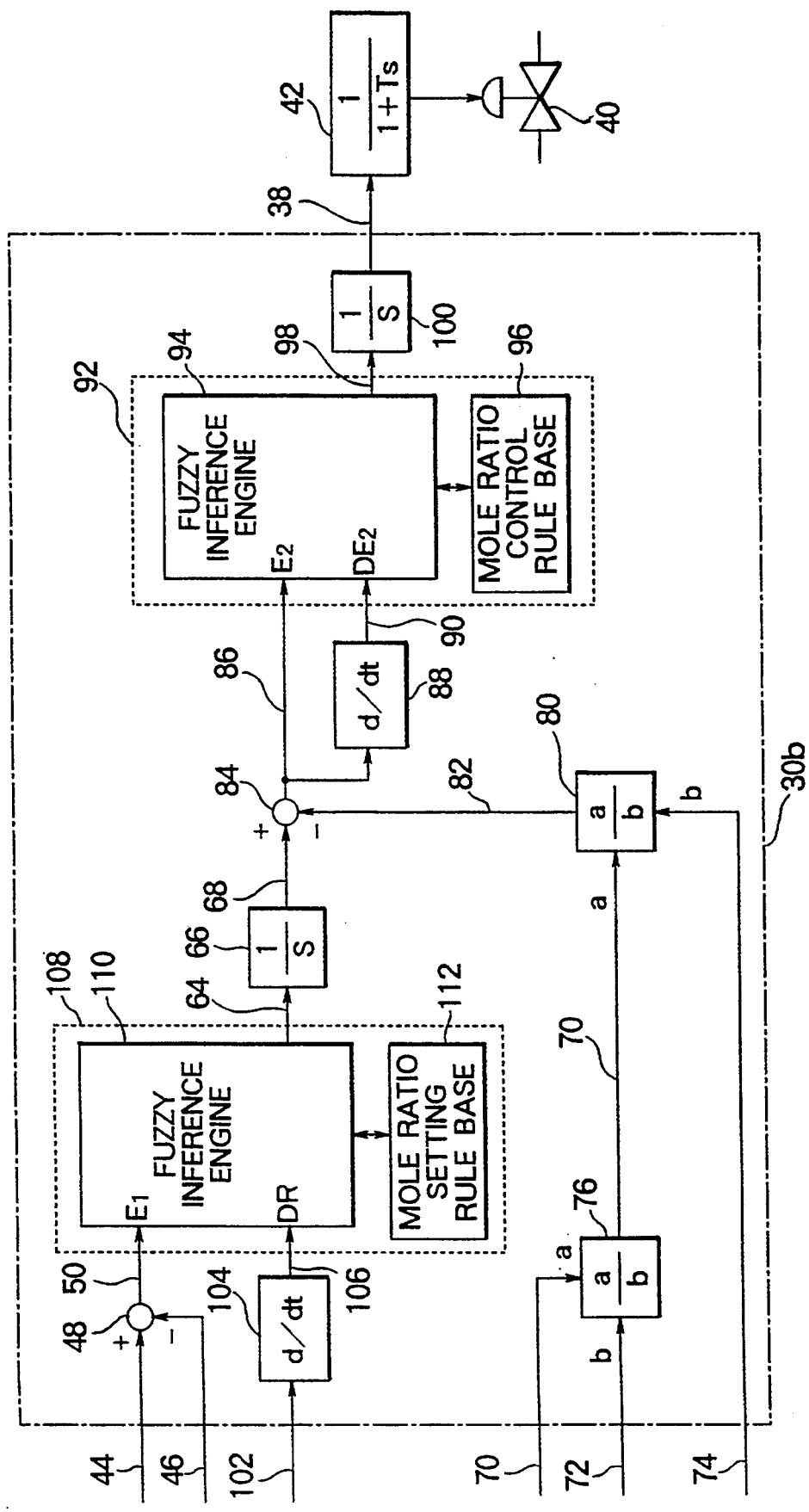
FIG. 6 is a block diagram where an input signal is changed in the embodiment of FIG. 2.

Referring now to FIG. 6, a nitrogen oxide removal controller 30b is supplied with a fuel flow amount ratio signal 102 of a main nozzle of a two-staged combustor instead of the water injection amount signal 52 which is supplied to the fuzzy controller 58 of the nitrogen oxide removal controller 30a as shown in FIG. 2. The fuel flow amount ratio signal 102 is changed to a change rate signal 106 of a fuel flow amount ratio by a differentiator 104 like the water injection amount signal 52. The signal 106 is supplied to a fuzzy controller 108. The fuzzy controller 108 fires a corresponding rule of a mole ratio setting rule data base 112 which uses a value DR of the fuel flow amount ratio change rate signal 106 and a value E1 of a $NO_x$ deviation signal 50 for conditional statement, and implement fuzzy inference by a fuzzy engine 110 on the basis of the value E1 and DR. As a result, the controller 108 produces a mole ratio change rate signal 64 (DM). Later steps are the same as those of the nitrogen oxide removal controller 30a as shown in FIG. 2.

As described above, if the fuel flow amount ratio signal 102 of a main nozzle in a two-staged combustor is used instead of the water injection amount signal 52, the same actions and effects can be obtained.

Figure 7:
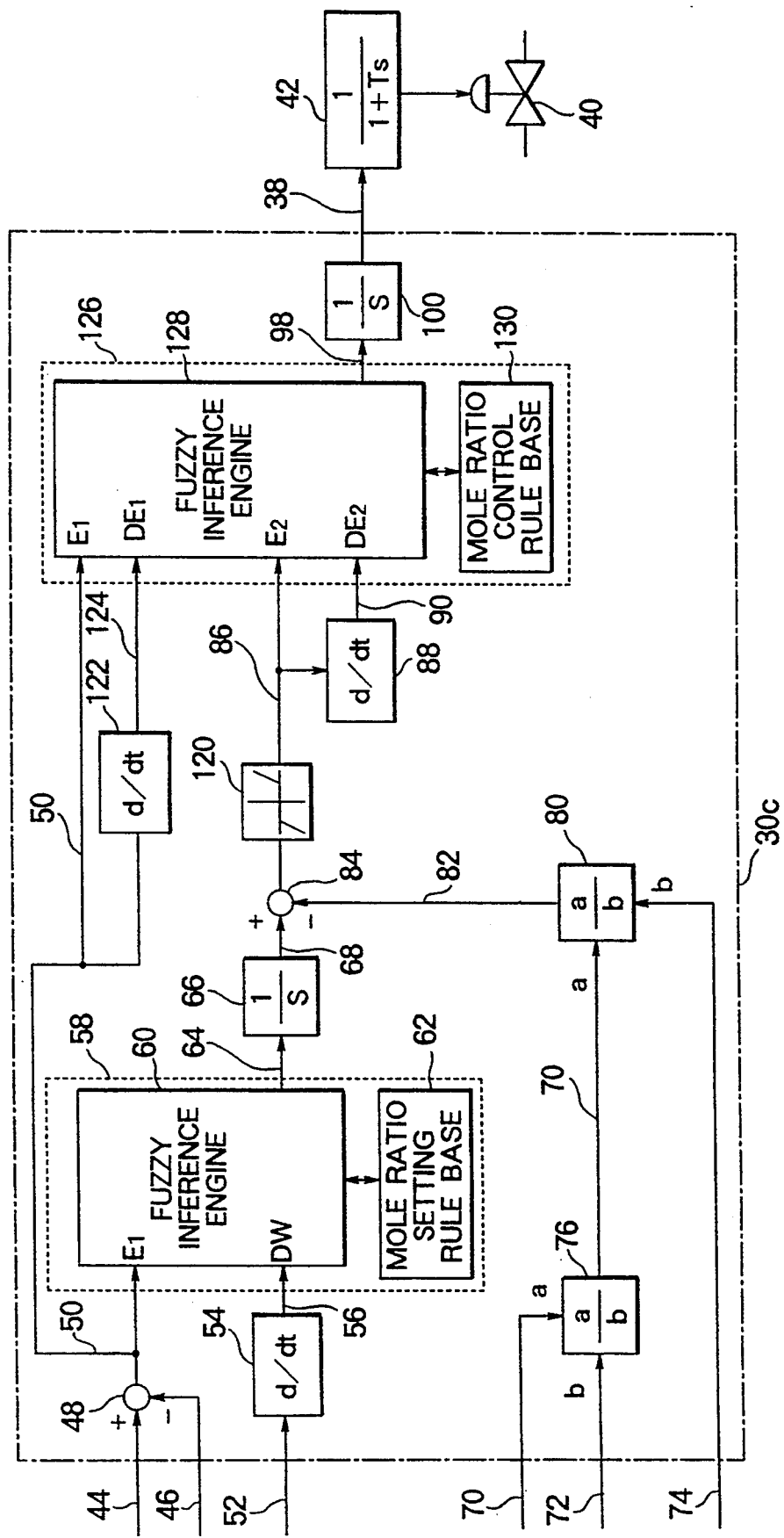
FIG. 7 is a block diagram showing another embodiment of a nitrogen oxide removal apparatus according to the invention.

Referring now to FIG. 7, as compared with the nitrogen oxide removal controller 30a as shown in FIG. 2, a nitrogen oxide removal controller 30c further has a dead band 120 and a differentiator 122. The dead band 120 allows a mole ratio deviation signal 86 to pass through, if the absolute value of the mole ratio deviation signal 86 exceeds a certain value. The differentiator 122 time differentiates a $NO_x$ deviation signal 50. In addition, instead of the fuzzy controller 92 which generates the valve opening degree manipulating signal 98 by fuzzy inference on the basis of the mole ratio deviation signal 86 and the mole ratio deviation change rate signal 90, there is provided a fuzzy controller 126 which generates a valve opening degree manipulating signal 98 by using a $NO_x$ deviation signal 50 (E1), a $NO_x$ deviation change rate signal 124 (DE1) obtained via the differentiator 122, a mole ratio deviation signal 86 (E2) with the absolute value exceeding the certain value via the dead band 120, and a mole ratio deviation change rate signal 90 (DE2) obtained by time differentiating this mole ratio deviation signal 86 as input signals.

A deviation E1 of a set $NO_x$ concentration signal 44 and a measured $NO_x$ concentration signal 46 is an input to the fuzzy controller 58 for calculating a mole ratio change rate signal 64 as well as an input to the fuzzy controller 126 for calculating a valve opening degree manipulating signal 98. Further, the $NO_x$ deviation change rate DE1 (signal 124), which is obtained by time differentiating the $NO_x$ deviation signal 50, is also supplied to the fuzzy controller 126.

The fuzzy controller 126 fires a corresponding rule of a mole ratio control rule data base 130 by a fuzzy inference engine 128 to implement fuzzy inference in a valve opening degree manipulating signal 98, in dependence on the $NO_x$ deviation signal 50 (E1), the $NO_x$ deviation change rate signal 126 (DE1), the mole ratio deviation signal 86 (E2) via the dead band 120 and the mole ratio deviation change rate signal 90 (DE2) which are inputs of conditional statements of the rule 128.

If the absolute value of a mole ratio deviation signal 86, which is obtained by dividing a set mole ratio signal 68 by a predicted mole ratio signal 82, is a certain value or less, the signal 86 is cut not to supply to the fuzzy controller 126. At the same time, since a differentiator 88 is on the output side of the dead band 120, a mole ratio deviation change rate signal 90 is not also supplied to the fuzzy controller 126.

Thus, if the absolute value of the mole ratio deviation signal 86 is small, the fuzzy controller 126 conducts feedback control based on a $NO_x$ deviation signal 50 (E1) and a $NO_x$ deviation change rate signal 124 (DE1). This further increase the control performance.

Figure 8:
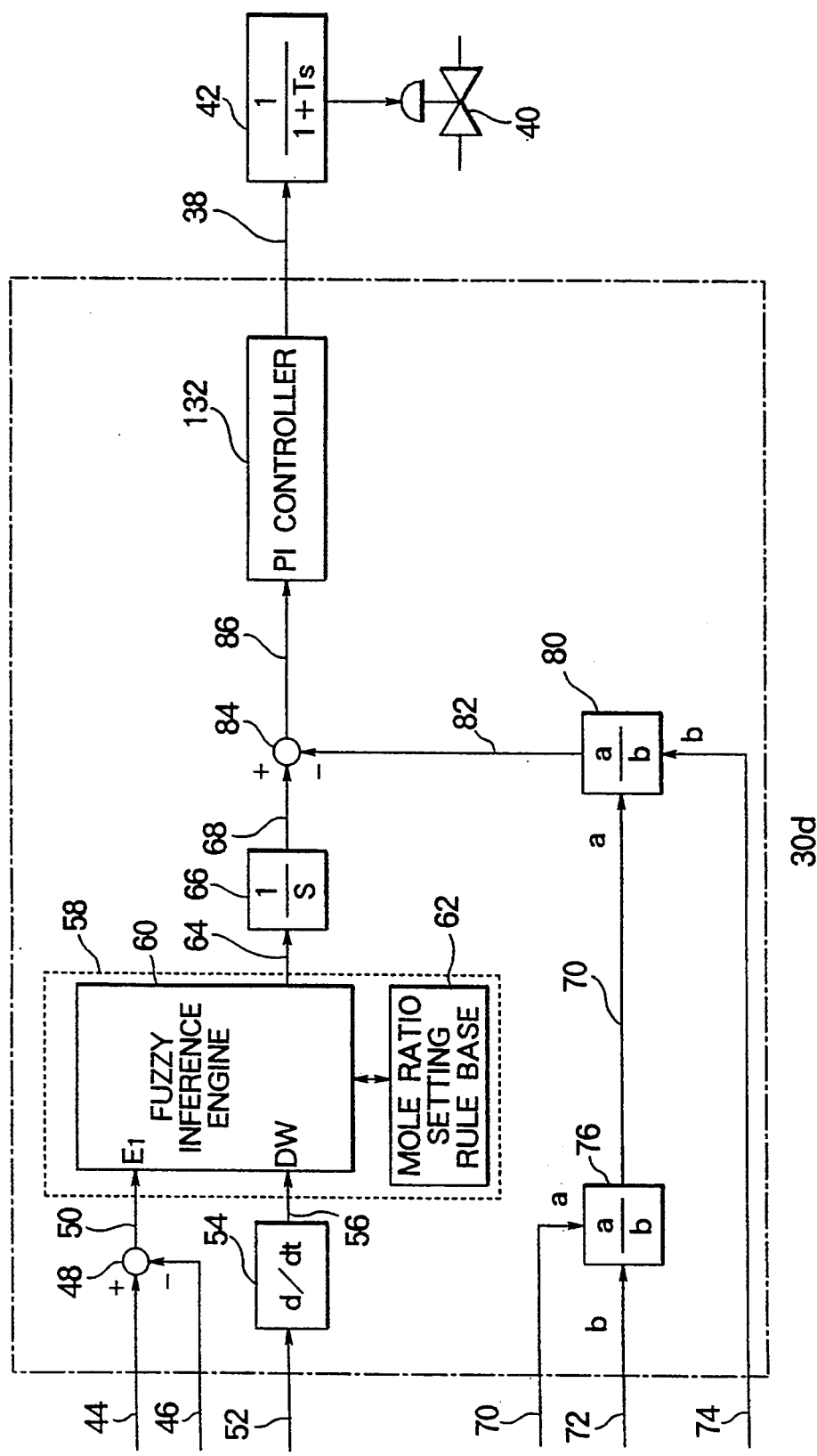
FIG. 8 is a block diagram showing still another embodiment of a nitrogen oxide removal apparatus according to the invention.

Referring now to FIG. 8, a nitrogen oxide removal control device 30d is different from the nitrogen oxide removal control device 30a as shown in FIG. 2 in the structure of a mole ratio control system 36. The device 30d is provided with a proportional plus integral controller 132 which generates a valve opening degree control signal 38 in dependence on a mole ratio deviation signal 86.

In this structure, proportional plus integral control is performed such that a set mole ratio signal 68 coincides with a predicted mole ratio signal 82. Here, the signal 68 is produced in dependence on a $NO_x$ deviation signal 50 and a water injection amount signal 52 by a mole ratio setting system, and the signal 82 is produced from an ammonia flow amount signal 70, an exhaust gas flow amount signal 72 and a predicted $NO_x$ concentration signal 74 of a nitrogen oxide removal device inlet. The same effects as those of the nitrogen oxide removal control device 30a as shown in FIG. 2 can be obtained.

Figure 9:
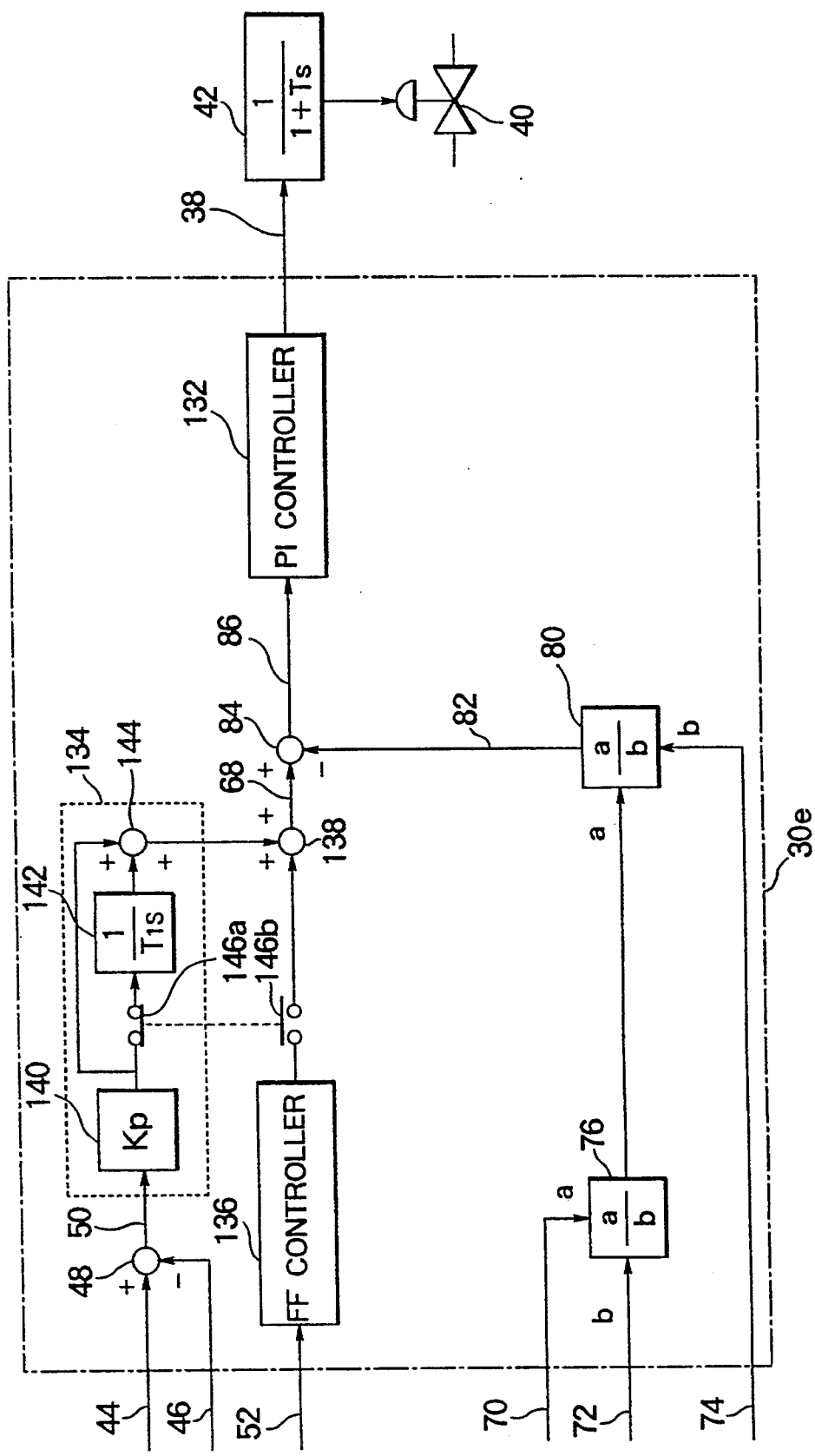
FIG. 9 is a block diagram showing further still another embodiment of a nitrogen oxide removal apparatus according to the invention.

Referring now to FIG. 9, a nitrogen oxide removal control device 30e has the mole ratio setting system of which the structure is changed in the nitrogen oxide removal control device 30d as shown in FIG. 8. The mole ratio setting system of the nitrogen oxide removal control device 30e is composed of a proportional plus integral controller 134, a feedforward controller 136 and an adder 138. The proportional plus integral controller 134 calculates an ammonia/$NO_x$ mole ratio based on a $NO_x$ deviation signal 50. The feedforward controller 136 calculates an ammonia/$NO_x$ mole ratio based on a water injection signal 52. The adder 138 adds an output of the proportional plus integral controller 134 to an output of the feedforward controller 136 to supply a set mole ratio signal 68.

The proportional plus integral controller 134 is composed of a proportional controller 140, an integral controller 142 and an adder 144. The proportional controller 140 does proportional operation of a $NO_x$ deviation signal 50. The integral controller 142 integrates an output of the proportional controller 140. The adder 144 adds an output of the proportional controller 140 to an output of the integral controller 142. There are provided contacts 146a, 146b between the proportional controller 140 and the integral controller 142 and between the feedforward controller 138 and the adder 136. The contacts 146a, 146b are opened/closed inversely with each other. Generally the contact 146a is closed and the contact 146b is opened. However, if change in a water injection amount is detected, a relay is activated so that the contact 146a is opened and the contact 146b is closed.

Thus, if a water injection amount does not change, the contact 146b is opened. A set mole ratio signal 68 is then calculated on the basis of a $NO_x$ deviation signal 50 such that a measured $NO_x$ concentration (a signal 46) is the same as a set $NO_x$ concentration (a signal 44). However, if a water injection amount which immediately influences $NO_x$ concentration changes, the contact 146b is closed. Accordingly, a mole ratio signal based on a water injection amount signal 52 is added to a set mole ratio signal 68, allowing nitrogen oxide removal control to follow up the change in a water injection amount with little lag. At this time, since control based on a relatively time delayed $NO_x$ deviation signal 50 is substantially ineffective, the contact 146a is opened. Input to the integral controller 142 is cut to prevent unnecessary history from remaining in the integral controller 142.

This structure can also provide a nitrogen oxide removal control apparatus with the excellent performance and stability.

Although the preferred embodiments as shown in the drawings are described above, the present invention is not limited thereto. Various changes and modifications may be made in the invention without departing from the spirit and scope as set in the claims.

What is claimed is:

1. A nitrogen oxide removal control apparatus for controlling an amount of ammonia to be injected in a nitrogen oxide removal device, the apparatus comprising:
    a gas turbine producing an exhaust gas flow;
    a nitrogen oxide removal device downstream of said gas turbine in said exhaust gas flow;
    a predicted mole ratio operating system for calculating a mole ratio of injected ammonia to a predicted $NO_x$ in the exhaust gas based on a predicted $NO_x$ concentration value at an inlet of the nitrogen oxide removal device, the value being calculated from a state value of the gas turbine, a flow amount value of the exhaust gas, and a flow amount value of ammonia injected into the exhaust gas;
    a mole ratio setting system for calculating a set mole ratio value of ammonia to $NO_x$ based on a deviation of a measured $NO_x$ concentration value at an outlet of the nitrogen oxide removal device and a set $NO_x$ concentration value, and a state amount of $NO_x$ reducing means in a combustor of the gas turbine;
    a mole ratio control system for calculating an amount of ammonia to be injected based on a deviation of an output from the mole ratio setting system and an output from the predicted mole ratio operating system, and;
    means for injecting said amount of ammonia into said exhaust gas flow upstream of said nitrogen oxide removal device.

2. The apparatus of claim 1, wherein the mole ratio setting system comprises:
    a differentiator for time differentiating the state amount of the $NO_x$ reducing means;
    a fuzzy controller, for generating a mole ratio change rate of ammonia to $NO_x$ by using fuzzy inference based on the deviation of the measured $NO_x$ concentration value and the set $NO_x$ concentration value, and a change rate of the state amount of the $NO_x$ reducing means from the differentiator; and
    an integrator for integrating the mole ratio change rate to produce a set mole ratio value.

3. The apparatus of claim 1, wherein the mole ratio setting system comprises:
    a proportional plus integral controller for producing a mole ratio of ammonia to $NO_x$ by proportional and integral operation based on the deviation of the measured $NO_x$ concentration value and the set $NO_x$ concentration value;

a feedforward controller for calculating a mole ratio of ammonia to $NO_x$ based on the state amount of the $NO_x$ reducing means; and an adder for adding an output of the proportional plus integral controller and an output of the feedforward controller to produce the set mole ratio value.

4. The apparatus of claim 1, wherein the state amount of the $NO_x$ reducing means is an amount of water or water steam injected to the combustor.

5. The apparatus of claim 1, wherein the state amount of the $NO_x$ reducing means is a ratio of a fuel flow amount from a main nozzle to total fuel flow amount into a two-staged combustor.

6. The apparatus of claim 1, wherein the mole ratio control system comprises:

a differentiator for time differentiating a mole ratio deviation which is the deviation of the output from the mole ratio setting system and the output from the predicted mole ratio operating system to produce a mole ratio deviation change rate;

a fuzzy controller for calculating a change rate of ammonia flow amount to be injected based on the mole ratio deviation and the mole ratio deviation change rate by using fuzzy inference; and an integrator for integrating the change rate of ammonia flow amount to produce an amount of ammonia to be injected.

7. The apparatus of claim 1, wherein the mole ratio control system comprises:

a dead band, for permitting only a mole ratio deviation of which an absolute value exceeds a certain value to pass through, said mole ratio deviation being the deviation of the output from the mole ratio setting system and the output from the predicted mole ratio operating system;

a differentiator for time differentiating the mole ratio deviation supplied from the dead band to produce a mole ratio deviation change rate;

a differentiator for time differentiating a $NO_x$ deviation which is the deviation of the measured $NO_x$ concentration value and the set $NO_x$ concentration value to produce a $NO_x$ deviation change rate;

a fuzzy controller for generating a change rate of ammonia flow control value by using fuzzy inference based on the mole ratio deviation from the dead band, the mole ratio deviation change rate, the $NO_x$ deviation and the $NO_x$ deviation change rate; and an integrator for integrating the change rate of ammonia flow control value to produce ammonia flow control value opening amount to be injected.

8. The apparatus of claim 1, wherein the mole ratio control system comprises a proportional plus integral controller for producing an ammonia flow control value by proportional and integral operation based on the deviation of the output from the mole ratio setting system and the output from the predicted mole ratio operating system.

9. The apparatus of claim 2, wherein the mole ratio control system comprises:

a differentiator for time differentiating a mole ratio deviation which is the deviation of the output from the mole ratio setting system and the output from the predicted mole ratio operating system to produce a mole ratio deviation change rate;

a fuzzy controller for generating an ammonia flow control value change rate based on the mole ratio deviation and the mole ratio deviation change rate by using fuzzy inference; and an integrator for integrating the ammonia flow control value change rate to produce an ammonia control value opening.

10. The apparatus of claim 2, wherein the mole ratio control system comprises:

a dead band, for permitting only a mole ratio deviation which of an absolute value exceeds a certain value to pass through, said mole ratio deviation being the deviation of the output from the mole ratio setting system and the output from the predicted mole ratio operating system;

a differentiator for time differentiating the mole ratio deviation supplied from the dead band to produce a mole ratio deviation change rate;

a differentiator for time differentiating a $NO_x$ deviation which is the deviation of the measured $NO_x$ concentration value and the set $NO_x$ concentration value to produce a $NO_x$ deviation change rate;

a fuzzy controller, for generating a change rate of ammonia flow control value by using fuzzy inference based on the mole ratio deviation from the dead band, the mole ratio deviation change rate, the $NO_x$ deviation and the $NO_x$ deviation change rate; and an integrator for integrating the change rate of ammonia flow control value to produce ammonia flow control value opening.

11. The apparatus of claim 2, wherein the mole ratio control system comprises a proportional plus integral controller for producing an ammonia flow control value opening by proportional and integral operation based on the deviation of the output from the mole ratio setting system and the output from the predicted mole ratio operating system.

12. The apparatus of claim 3, wherein the mole ratio control system comprises a proportional plus integral controller for producing an ammonia flow amount to be injected by proportional and integral operation based on the deviation of the output from the mole ratio setting system and the output from the predicted mole ratio operating system.

* * * * *